US008665376B2

(12) United States Patent
Mathew et al.

(10) Patent No.: US 8,665,376 B2
(45) Date of Patent: Mar. 4, 2014

(54) METHODS AND SYSTEMS FOR FILTERING NOISE IN VIDEO DATA

(71) Applicant: Texas Instruments Incorporated, Dallas, TX (US)

(72) Inventors: Manu Mathew, Bangalore (IN); Shyam Jagannathan, Bangalore (IN); Soyeb Noomohammed Nagori, Bangalore (IN); Hrushikesh Tukaram Garud, Parbhani (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/857,443

(22) Filed: Apr. 5, 2013

(65) Prior Publication Data

US 2013/0271664 A1 Oct. 17, 2013

(30) Foreign Application Priority Data

Apr. 12, 2012 (IN) .............................. 1486/CHE/2012

(51) Int. Cl.
*H04N 5/21* (2006.01)
(52) U.S. Cl.
USPC .......................................... 348/607; 348/620

(58) Field of Classification Search
USPC ......... 348/607, 624, 608, 612, 613, 620, 621, 348/699, 700; 382/275; 375/240.16
IPC ........................................ H04N 5/21,5/14, 9/64
See application file for complete search history.

(56) References Cited

U.S. PATENT DOCUMENTS

| 2008/0062327 | A1* | 3/2008 | MacInnis et al. | 348/607 |
| 2011/0019093 | A1* | 1/2011 | Zhong | 348/607 |
| 2012/0257113 | A1* | 10/2012 | Hsu et al. | 348/607 |

* cited by examiner

*Primary Examiner* — Sherrie Hsia
(74) *Attorney, Agent, or Firm* — Mirna Abyad; W. James Brady; Frederick J. Telecky, Jr.

(57) ABSTRACT

Several systems and methods for filtering noise from a picture in a picture sequence associated with video data are disclosed. In an embodiment, the method includes accessing a plurality of pixel blocks associated with the picture and filtering noise from at least one pixel block from among the plurality of pixel blocks. The filtering of noise from a pixel block from among the at least one pixel block includes identifying pixel blocks corresponding to the pixel block in one or more reference pictures associated with the picture sequence. Each identified pixel block is associated with a cost value. One or more pixel blocks are selected from among the identified pixel blocks based on associated cost values. Weights are assigned to the selected one or more pixel blocks and set of filtered pixels for the pixel block is generated based on the weights.

20 Claims, 4 Drawing Sheets

METHODS AND SYSTEMS FOR FILTERING NOISE IN VIDEO DATA

TECHNICAL FIELD

The present disclosure generally relates to the field of video data processing.

BACKGROUND

In an example scenario, video pictures may be corrupted by noise during capture, processing and/or presentation. For example, noise may be introduced in video pictures during capture as a result of inaccuracies in an imaging sensor, lack of lighting or exposure, errors in electronic interactions (e.g., analog-to-digital conversions), transmission errors within the sensor circuit, and the like. During processing (e.g., compression) of the video pictures, quantization noise may be introduced in the video pictures. Similarly, aliasing errors may be introduced in the video pictures while resolution conversions are performed during presentation. The noise introduced in the video pictures during capture is especially problematic as it adversely affects an output of subsequent processing stages (including compression and presentation).

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Various systems, methods, and computer-readable mediums configured for filtering noise from a picture in a picture sequence associated with video data are disclosed. In an embodiment, the method includes accessing a plurality of pixel blocks associated with the picture and filtering noise from at least one pixel block from among the plurality of pixel blocks. The filtering of noise from a pixel block from among the at least one pixel block includes identifying pixel blocks corresponding to the pixel block in one or more reference pictures associated with the picture sequence. Each identified pixel block is associated with a cost value. The cost value is a measure indicative of a correlation between an identified pixel block and the pixel block. The filtering of noise from the pixel block further includes selecting one or more pixel blocks from among the identified pixel blocks based on associated cost values. The filtering of noise from the pixel block further includes assigning weights to the selected one or more pixel blocks, where a weight is assigned to each of the selected one or more pixel blocks based on associated cost value. The filtering of noise from the pixel block further includes generating a set of filtered pixels for the pixel block based on the weights.

In an embodiment, the pixel blocks corresponding to the pixel block are identified in the one or more reference pictures based on performing block matching motion estimation (BMME) based search. In an embodiment, a size of a block for performing the BMME based search is determined to be one of an overlapping size and a non-overlapping size corresponding to a size of the pixel block. In an embodiment, the cost value associated with the each identified pixel block includes a difference measure computed between pixels corresponding to the each identified pixel block and the pixel block. In an embodiment, the difference measure is one of a sum of absolute differences (SAD) measure and sum of squared error (SSE) measure. In an embodiment, the difference measure is computed based on pixel luminance components. In an embodiment, a difference measure corresponding to the pixel block for each of the selected one or more pixel blocks based on pixel chrominance components is also computed. In an embodiment, the cost value is re-computed for each of the selected one or more pixel blocks, where the cost value is re-computed based on at least one of an un-weighted sum and a weighted sum of the difference measures computed for the pixel chrominance components and the pixel luminance components for corresponding pixels for the each selected one or more pixel blocks, and, a penalty factor determined based on estimated motion vectors for the each of the selected one or more pixel blocks.

In an embodiment, the one or more reference pictures includes a filtered form and an unfiltered form of pictures preceding the picture in a display order associated with the picture sequence and pictures succeeding the picture in the display order. In an embodiment, the method further includes associating a cost value with the pixel block and assigning a weight to the pixel block based on the associated cost value. In an embodiment, the cost value associated with the pixel block is determined to be one of a minimum cost value from among cost values associated with the selected one or more pixel blocks and a first pre-determined threshold. In an embodiment, the cost value associated with the pixel block is determined based on performing a spatial domain cost value estimation by searching around a pre-defined location in the picture. In an embodiment, the weights are assigned to the selected one or more pixel blocks and the pixel block based on associated cost values and an estimate of noise variance.

In an embodiment, the noise variance is estimated based on an average difference measure for pixels corresponding to a previously filtered picture. In an embodiment, an average intensity for pixels associated with the pixel block is computed, and, a range of intensities from among a plurality of ranges of intensities to which the computed average intensity belongs to is identified. In an embodiment, the plurality of ranges of intensities corresponds to the previously filtered picture. In an embodiment, the noise variance is estimated to be equivalent to a value of noise variance associated with the identified range of intensities.

In an embodiment, weights assigned to the selected one or more pixel blocks and the pixel block are normalized and a weighted pixel block averaging of normalized weights and a set of corresponding pixels associated with each of the selected one or more pixel blocks and the pixel block is performed to generate the set of the filtered pixels.

In an embodiment, the method further includes controlling an amount of filtering of pixels of the pixel block to be filtered based on a pre-defined tolerance value. In an embodiment, the method further includes performing dithering to the set of filtered pixels.

Additionally, in an embodiment, a system for filtering noise from a picture in a picture sequence associated with video data is provided. The system includes a memory module and a processing module. The memory module is configured to provide access to a plurality of pixel blocks associated with the picture. The processing module is communicatively associated with the memory module for filtering noise from at least one pixel block from among the plurality of pixel blocks. For filtering noise from a pixel block of the at least one pixel block, the processing module is configured to identify pixel blocks corresponding to the pixel block in one or more reference pictures associated with the picture sequence. Each identified pixel block is associated with a cost value. The cost value is a measure indicative of a correlation between an identified pixel block and the pixel block. The processing module is further configured to select one or more pixel blocks from among the identified pixel blocks based on associated cost values. The processing module is further configured to assign weights to the selected one or more pixel blocks, where a weight is assigned to each of the selected one or more pixel blocks based on associated cost value. The processing module is further configured to generate a set of filtered pixels for the pixel block based on the weights.

Moreover, in an embodiment, a non-transitory computer-readable medium storing a set of instructions that when executed cause a computer to perform a method for filtering noise from a picture in a picture sequence associated with video data is disclosed. In an embodiment, the method includes accessing a plurality of pixel blocks associated with the picture and filtering noise from at least one pixel block from among the plurality of pixel blocks. The filtering of noise from a pixel block from among the at least one pixel block includes identifying pixel blocks corresponding to the pixel block in one or more reference pictures associated with the picture sequence. Each identified pixel block is associated with a cost value. The cost value is a measure indicative of a correlation between an identified pixel block and the pixel block. The filtering of noise from the pixel block further includes selecting one or more pixel blocks from among the identified pixel blocks based on associated cost values. The filtering of noise from the pixel block further includes assigning weights to the selected one or more pixel blocks, where a weight is assigned to each of the selected one or more pixel blocks based on associated cost value. The filtering of noise from the pixel block further includes generating a set of filtered pixels for the pixel block based on the weights.

Other aspects and example embodiments are provided in the drawings and the detailed description that follows.

The drawings referred to in this description are not to be understood as being drawn to scale except if specifically noted, and such drawings are only exemplary in nature.

DETAILED DESCRIPTION

Pursuant to an example scenario, video pictures constituting video data are often corrupted by noise during capture, processing and/or presentation. Such a corruption of the video pictures degrades a quality of the video data. The noise is removed (for example, filtered) from the video data as explained herein with reference to FIG. 1.

Figure 1:
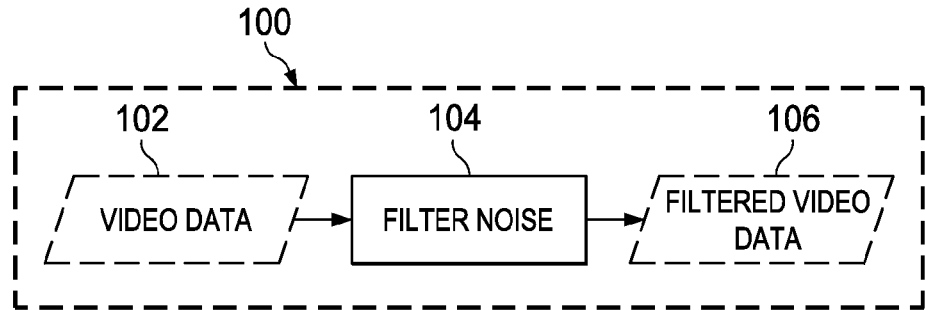
FIG. 1 illustrates a simplified overview of a process flow for filtering of video data in accordance with an example scenario.

FIG. 1 illustrates a simplified overview of a process flow 100 for filtering of video data (for example, video data 102), in accordance with an example scenario. The video data 102 includes a sequence of video pictures (hereinafter referred to as a 'picture sequence') and each video picture (hereinafter referred to as a 'picture') from among the picture sequence includes a plurality of pixel blocks (for example, 4×4 blocks of pixels or 16×16 blocks of pixels) of video data 102. At 104, noise is filtered, i.e. substantially removed, from the video data 102 for filtering of the video data. The filtering of noise from the video data 102 involves filtering noise from one or more pixel blocks corresponding to the pictures in the video data 102. Filtering noise from the pictures in the picture sequence corresponding to the video data 102 generates filtered video data 106.

Pursuant to an example scenario, the filtered video data 106 may be utilized for video playback for viewing purposes. Pursuant to an example scenario, the filtered video data 106 may be utilized for video analytics purposes. Alternatively, the filtered video data 106 may be stored for subsequent viewing/display of the video data 102. Pursuant to an example scenario, the filtered video data 106 may be compressed so as to efficiently utilize a storage capacity during storage or a spectrum/bandwidth during a transmission.

Pursuant to an example scenario, a video encoder may perform the process flow 100 prior to encoding of the video data 102. The video data 102 may be received by the video encoder from a media capture device. Examples of a media capture device may include a video camera or a camcorder. The media capture device may be, for example, a stand-alone device or a part of a mobile device, such as, for example, a Smartphone, or a data processing device, such as, for example, a personal computer, a laptop device or a personal digital assistant (PDA). The video data 102 may also be received by the video encoder from a transcoding system (which may be implemented, for example, in any of hardware, software and/or firmware), which may be a stand-alone device or a part of the media capture device.

Pursuant to an example scenario, elimination of noise from the pictures prior to their compression improves compression efficiency especially at moderate to high noise levels. However, a loss of details, excessive blurring and/or increased delay may occur during noise removal. Various embodiments of the present technology, however, provide methods, systems, and computer-readable mediums for filtering noise from pictures associated with video data that are capable of overcoming these and other obstacles and providing additional benefits. An example system configured to filter noise from pictures corresponding to the video data is described herein with reference to FIG. 2.

Figure 2:
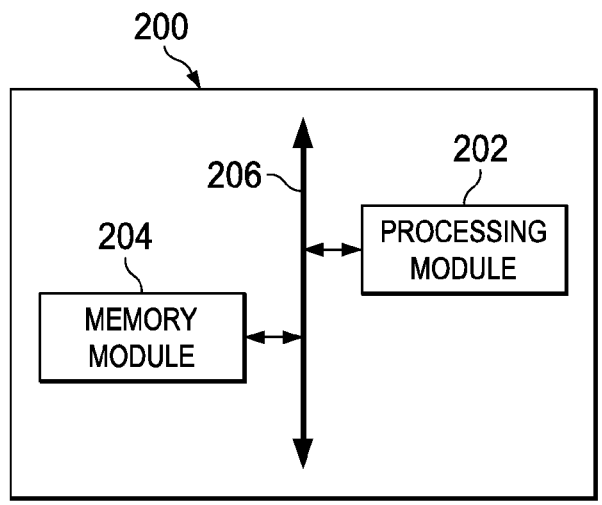
FIG. 2 is a block diagram of a system for filtering noise from a picture in a picture sequence associated with video data in accordance with an example embodiment.

FIG. 2 is a block diagram of an example system 200 for filtering noise from a picture in a picture sequence associated with video data, such as the video data 102, in accordance with an embodiment. In an embodiment, the system 200 may be configured within video processing devices with or without the capability of video playback. Examples of the video processing devices include, but are not limited to: (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers. In another embodiment, the system 200 may be configured to be included within a video encoder/decoder (hereinafter referred to as a video codec). Pursuant to an example scenario, the video codec may be any machine capable of executing a set of instructions (sequential and/or otherwise) so as to perform an encoding and decoding of video data 102. In an embodiment, the video codec may be configured within a video processing device. Alternatively, in an embodiment, the system 200 may be communicatively associated or coupled with a video codec such that pictures filtered from noise may be provided to the video codec. In an embodiment, the system 200 may be configured within a video content analysis (VCA) system. The video data may include, for example, frames, fields and/or pictures comprising moving content.

In an embodiment, the system 200 is configured to include a processing module 202 and a memory module 204. In an embodiment, the processing module 202 and the memory module 204 are configured to communicate with each other via or through a bus 206. Examples of the bus 206 include, but are not limited to, a data bus, an address bus, a control bus, and the like. The bus 206 may be, for example, a serial bus, a bi-directional bus or a unidirectional bus.

In an embodiment, the memory module 204 is configured to provide access to a plurality of pixel blocks associated with the picture. Additionally, the memory module 204 stores instructions for processing one or more pixel blocks from among the plurality of pixel blocks corresponding to the picture. Examples of the memory module 204 include, but are not limited to, a random access memory (RAM), a synchronous dynamic RAM (SDRAM), a double data rate SDRAM (DDR SDRAM), and the like.

In an embodiment, the processing module 202 is configured to filter noise from at least one pixel block from among the plurality of pixel blocks associated with the picture (provided by the memory module 204) for filtering the picture. In an embodiment, the processing module 202 may be embodied as a multi-core processor, a single-core processor, or a combination of one or more multi-core processors and one or more single-core processors. For example, the processing module 202 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing module 202 may be configured to execute hard-coded functionality. In an embodiment, the processing module 202 may be embodied as an executor of software instructions, wherein the instructions may specifically configure the processing module 202 to perform the algorithms and/or operations described herein when the instructions are executed. The processing module 202 may include, among other things, a clock, an arithmetic logic unit (ALU) and logic gates configured to support an operation of the processing module 202. In an embodiment, the processing module 202 may be an advanced reduced instruction set computer (RISC) machine (ARM) processor.

In an embodiment, for filtering noise from a pixel block (hereinafter referred to as a current pixel block), the processing module 202 is configured to identify pixel blocks corresponding to the current pixel block in one or more reference pictures associated with the picture sequence. More specifically, the processing module 202 is configured to identify pixel blocks in one or more reference pictures that are substantially matching the current pixel block. The term 'substantially matching' as used herein refers to a match between a pixel block and the current pixel block, which corresponds to very low value of distortion (for example, a low amount of difference in corresponding pixel values, individually, or all pixel values considered together). For example, pixel blocks with lowest values of distortion from among the pixel blocks are considered as 'substantially matching' blocks. In an embodiment, the pixel blocks corresponding to (i.e. substantially matching to) the current pixel block in the one or more reference pictures are identified by performing block matching motion estimation (BMME) based search. In an embodiment, the BMME based search is performed using algorithms selected from among, but not limited to, a full search, a three-step search, a hexagonal search, a spiral search and a diamond search. In an embodiment, a search window is defined in the reference picture and best matching pixel blocks within the search window are identified. More specifically, within the defined search window, any of the BMME algorithms are utilized for block matching purposes. Once pixel blocks matching the current pixel block in the search window are identified, the corresponding motion vectors (indicating an amount of displacement of the matching pixel block in x and y directions in the reference picture) are determined. In an embodiment, a size of a pixel block utilized for performing BMME based search within the search window is overlapping or non-overlapping with respect to a size of the current pixel block. For example, if M is the size of the current pixel block, then a size "S" of the pixel block utilized for performing search within the search window is determined to be equal to M (i.e. non-overlapping configuration) or bigger than M (i.e. overlapping configuration). More specifically, the motion estimation search is performed over a pixel block of size "S×S" and the computed motion vector is assigned to the current pixel block "M×M" where S>=M. In an embodiment, the processing module 202 is configured to determine the size "S" either dynamically or based on preset parameters.

In an embodiment, multiple matching pixel blocks are identified per reference picture. For example, if motion estimation is performed on each of $N_{ref}$ number of reference pictures and if $M_{ref}$ is a number of best matching pixel blocks identified per reference $N_{ref}$ picture, then a total of $N_{ref}*M_{ref}$ matches are identified. It is noted that a large number of matching pixel blocks identified from a single reference picture provides a high amount of noise reduction as will be described herein with reference to FIGS. 2 to 7. However, using more than one reference picture and identifying more than one matching pixel block in each reference picture provides a much higher noise reduction without loss of details.

In an embodiment, the one or more reference pictures includes a filtered form and an unfiltered form of pictures preceding the picture in a display order associated with the picture sequence and pictures succeeding the picture in the display order. The pictures preceding the current picture (i.e. the picture containing the current pixel block) in the display order associated with the picture sequence are hereinafter referred to as past reference pictures. The past reference pictures are used for filtering pixel blocks in the current picture for example, for satisfying low delay requirements. The pictures succeeding the current picture in the display order associated with the picture sequence are hereinafter referred to as future reference pictures. In an embodiment, the memory module 204 is configured to store both, a filtered form and an unfiltered form of the past reference pictures and the future reference pictures. For effective noise reduction, filtered form of reference pictures (for example, any of the past reference pictures or the future reference pictures) are used. However, utilization of only filtered forms of the reference pictures may cause excessive blurring for regions in the current picture for which details may be visually important. In an embodiment, both filtered and unfiltered forms of the reference pictures are utilized as reference pictures. In an embodiment, motion estimation searches are performed on both filtered forms and unfiltered forms of the reference pictures and pixel blocks matching the current pixel block are identified. In an embodiment, the use of un-filtered form of the reference pictures helps in removing excessive blurring and in preserving of picture details.

As explained above, the memory module 204 stores both, a filtered form and an unfiltered form, for each reference picture. Since the filtered and the un-filtered form of a reference picture shares the same motion vectors, motion estimation on both versions of the same reference picture may be precluded. For example, the motion estimation is performed on a filtered form of a reference picture and the motion vectors identified, thereby providing the matching pixel blocks from the filtered form of the reference picture for filtering. The same motion vectors are also used to obtain the best matching pixel blocks from the corresponding un-filtered form of the reference picture. In an embodiment, the matches from the unfiltered form of the reference picture are added as additional matching pixel blocks for use in filtering. Alternatively, the motion estimation is performed on an unfiltered form of a reference picture and the motion vectors identified, thereby providing the matching pixel blocks from the unfiltered form of the reference picture for filtering. The same motion vectors are also used to obtain the best matching pixel blocks from the corresponding filtered form of the reference picture. Thus, motion estimation may be performed for only one form (for example, filtered or unfiltered form) of a past or future reference picture, however, matching pixel blocks for filtering noise may be identified from the corresponding form as well.

In an embodiment, each identified pixel block is associated with a cost value. The cost value is a measure indicative of a correlation between an identified pixel block and the pixel block. The term 'cost value' as used herein refers to a measure indicative of a match between each of the identified pixel blocks and the pixel block. The correlation as used herein refers to a match between the pixel values between the pixel blocks in the one or more reference pictures and the current pixel block. In an embodiment, the cost value associated with each identified pixel block includes a difference measure computed between pixels corresponding to the each identified pixel block and the current pixel block. In an embodiment, the difference measure is one of a sum of absolute differences (SAD) measure and sum of squared error (SSE) measure.

In an embodiment, the difference measure is computed as depicted in equations (1) and (2):

$$\text{PixCost}(x,y) = \text{ABS}(O(x,y) - \text{Ref}(x,y)) \quad (1)$$

$$\text{Cost value} = \Sigma_x \Sigma_y \text{PixCost}(x,y) + (\text{Penalty factor})_{MV} \quad (2)$$

where PixCost (x,y) corresponds to absolute difference in pixel value at location (x,y) in current picture O (i.e. ABS (O(x,y))) and reference picture (i.e. Ref(x,y)). It is noted that value of Ref(x,y) as used herein takes into account corresponding change in location based on motion vector displacement within the reference picture. The cost value for the matching pixel block in the reference picture is a sum total of pixel values over all locations (x, y) in the matching pixel block (for example, a SAD value) and a penalty factor determined based on estimated motion vectors for the identified pixel blocks. The (Penalty factor)$_{MV}$ corresponds to a penalty factor, which may be included in the cost value computation to account for un-desired non-uniformity in motion vector alignment (especially within neighboring pixel blocks) in the reference picture. In an embodiment, any suitable value is chosen as the penalty factor for computation of the cost value.

In an embodiment, the difference measure is computed based on pixel luminance components. More specifically, each pixel of the pixel blocks in the current picture (and in other pictures of the picture sequence) includes a luminance component (Y) and one or more chrominance components (for example, $C_b$ and $C_r$). During block matching, a difference in pixel luminance components between pixels of the current pixel block and pixels in the one or more reference pictures is performed for identifying the matching pixel blocks (for example, the pixel blocks with least difference measure in luminance component values is chosen as the identified pixel blocks). Accordingly, each identified pixel block is associated with a cost value (which may correspond to a pixel luminance component difference measure). In an embodiment, the processing module 202 computes the difference measure based on the pixel chrominance components (for example, $C_b$ and/or $C_r$). In an embodiment, the sum of the corresponding pixel luminance components and the pixel chrominance components (i.e. pixel luminance values and pixel chrominance values) is chosen as the difference measure for computing the cost value associated with each of the identified pixel blocks.

In an embodiment, the processing module 202 is configured to select one or more pixel blocks from among the identified pixel blocks based on associated cost values. For example, from among $N_{ref}*M_{ref}$ matches, the processing module 202 may be configured to select $M_{tot}$ number of matches based on the cost values. The $M_{tot}$ number of matching pixel blocks and the current pixel block together configure the '$M_{tot}+1$' number of pixel blocks available for further processing. For example, the pixel blocks from among the identified pixel blocks with least difference measure (or least associated cost value) are selected.

In an embodiment, the cost value is re-computed for the selected one or more pixel blocks. As described earlier, the cost value for pixel luminance component (hereinafter referred to as $\text{Cost}_Y$) may be determined and the best matching pixel blocks identified based on the least cost value. For those selected one or more pixel blocks, difference measure i.e. the cost value for pixel chrominance components (hereinafter referred to as $\text{Cost}_{Cb}$ and $\text{Cost}_{Cr}$) may be computed and added to the pixel luminance components for corresponding pixels to determine the total cost value, i.e. cost value for the matching pixel blocks. Pursuant to an example scenario, the pixel luminance component values may be similar between two neighboring pixel blocks, but the pixel chrominance components values may be vastly different. In such cases it may be helpful to use a combination of pixel luminance and chrominance component cost values to better differentiate between good matches and bad matches. Accordingly, the cost value is re-computed to include the difference measure for the chrominance components. In an embodiment, visual quality improvement is observed by using a combination of luminance and chrominance cost values.

Moreover, utilizing cost value for pixel luminance components to identify pixel blocks and thereafter computing cost value for chrominance components from selected pixel blocks from among the identified pixel blocks simplifies the computation as the best motion vectors are already identified during computation of cost value for pixel luminance components, which is then utilized for computation of cost values for pixel chrominance components and total cost value for the matching pixel blocks therefrom.

In an embodiment, the computed cost value includes at least one of an un-weighted sum and a weighted sum of the difference measures computed for the pixel chrominance components and the pixel luminance components for corresponding pixels for the selected one or more pixel blocks, and, a penalty factor determined based on estimated motion vectors for each of the selected one or more pixel blocks. In an embodiment, the un-weighted sum of cost values from the luminance and chrominance components to get the total cost is computed as depicted in equation (3):

$$\text{Cost} = \text{Cost}_Y + \text{Cost}_{Cb} + \text{Cost}_{Cr} \tag{3}$$

In an embodiment, the weighted sum of cost values from the luminance and chrominance components to get the total cost is computed as depicted in equations (4), (5) and (6):

$$\text{Cost}'_Y = \text{Cost}_Y + (\text{Cost}_{Cb} * w_c) + (\text{Cost}_{Cr} * w_c) \tag{4}$$

$$\text{Cost}'_{Cb} = (\text{Cost}_Y * w_Y) + (\text{Cost}_{Cb}) \tag{5}$$

$$\text{Cost}'_{Cr} = (\text{Cost}_Y * w_Y) + (\text{Cost}_{Cr}) \tag{6}$$

where a value of $W_c$ ranges from 0-8 and a value of $W_Y$ ranges from 0 to 4.

In an embodiment, the processing module 202 is further configured to associate a cost value with the current pixel block. Since cost value corresponds to a distance (or difference) measure between pixels of the current pixel block and corresponding pixels of the matching pixel block, technically a cost value associated with the current pixel block is zero on account of absence of motion. However, for purposes of filtering noise in subsequent stages, a cost value is assigned to the current pixel block. In an embodiment, the cost value associated with the pixel block is determined to be one of a minimum cost value from among cost values associated with the selected one or more pixel blocks and a first pre-determined threshold. If the best cost value (i.e. least difference measure) from among the computed cost values for matching pixel blocks to the current pixel block is $C_{best}$, then a value of $C_{best}$ is obtained based on equation (7):

$$C_{best} = \min(C(j)), \text{ where } j=1,2,\ldots M_{ref} \tag{7}$$

If the cost value for current pixel block is represented by $C(0)$, then the cost value for the current pixel block is computed as depicted in equation (8):

$$C(0) = \min(C_{best}, \text{first pre-defined threshold}) \tag{8}$$

In an embodiment, the value of the first pre-defined threshold is chosen to be a suitably large number. For example, the first pre-defined threshold may be a multiple (for example, two to three times) of σ of a reference picture, immediately preceding the current picture. In an embodiment, the cost value associated with the current pixel block is determined based on performing a spatial domain cost value estimation by searching around a pre-defined location in the picture. In an embodiment, the spatial domain cost value estimation is performed based on one of an estimation of a gradient associated with the current pixel block and an motion estimation search performed in the immediate neighborhood on the current pixel block. In an embodiment, an average absolute gradient measure is used as an estimate of the cost value of the current pixel block. In an embodiment, the gradient is defined as depicted in equation (9):

$$\text{PixCost}_{xy} = \text{ABS}(O(x+1,y) - O(x,y)) + \text{ABS}(O(x,y+1) - O(x,y)) \tag{9}$$

where $O(x,y)$ is the pixel value at position $(x,y)$ of the current pixel block.

Based on the equation (9), the cost value for current pixel block is determined as depicted in equation (10):

$$\text{Cost of current pixel block} = \Sigma_x \Sigma_y \text{PixCost}_{xy} \tag{10}$$

In an embodiment, the processing module 202 determines the cost value for the current pixel block by performing a motion estimation search in the neighborhood of the current pixel block as depicted in equations (11) and (12):

$$\text{SearchCost}_{mn} = \Sigma x \Sigma y \text{ABS}(O(x,y) - O(x+m, y+n)) \tag{11}$$

$$\text{Cost of the current pixel block} = \min_{mn}(\text{SearchCost}_{mn}) \tag{12}$$

Where m and n are the pixel positions around location (0,0) corresponding to the central location of the current pixel block, and, at least one of m and n is a non-zero value.

In an embodiment, the search range is adjusted by +1/−1, however, larger adjustments may also be optionally considered. Pursuant to an example scenario, performing a motion estimation search in the neighborhood of the current pixel block provides better visual quality compared to the gradient based cost value determination technique. However, the gradient based cost value determination technique is computationally less expensive compared to motion estimation search in the neighborhood of the current pixel block.

In an embodiment, the processing module 202 is further configured to assign weights to the selected one or more pixel blocks. In an embodiment, a weight is assigned to each of the selected one or more pixel blocks based on associated cost value. In an embodiment, the processing module 202 is further configured to assign a weight to the current pixel block based on the associated cost value. In an embodiment, the weights are assigned to the selected one or more pixel blocks and the current pixel block based on associated cost values and an estimate of noise variance. In an embodiment, the weights are assigned based on an exponential weighting function as depicted in equation (13):

$$wu(i) = \exp(-c(i)^2 / \sigma^2) \tag{13}$$

if $c(i) <$ second pre-defined threshold $= 0$ if $c(i) >=$ second pre-defined threshold where,
$i = 0, 1, \ldots M_{tot}$
$wu(i)$ is an un-normalized weight assigned to $i^{th}$ pixel block,
$c(i)$ is the cost associated with the $i^{th}$ pixel block
$\sigma^2$ is the measure of noise variance, and
$M_{tot}$ is $n^{th}$ pixel block identified from among n identified pixel blocks.

An example variation in assigned weights corresponding to different cost values is explained with reference to FIG. 3.

Figure 3:
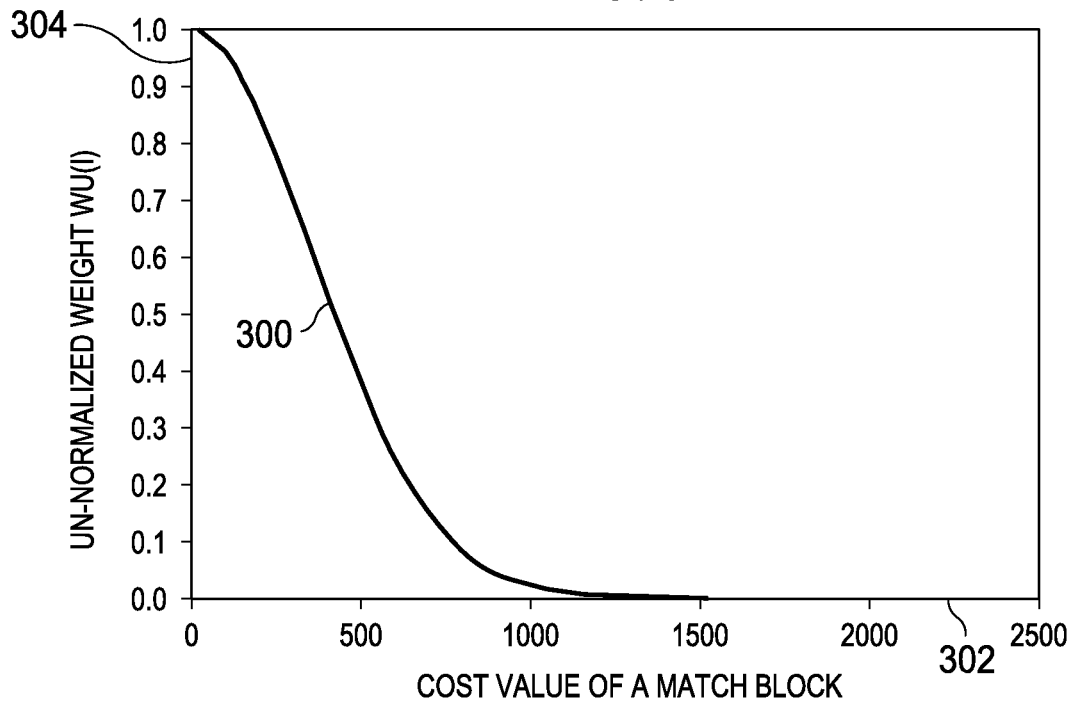
FIG. 3 illustrates a plot of variation in un-normalized weights with variation in cost values for a pre-defined noise estimate in accordance with an example embodiment.

Referring now to FIG. 3, a plot 300 of variation in un-normalized weights with variation in cost values for a pre-defined noise variance estimate is depicted in accordance with an example embodiment. In FIG. 3, the un-normalized weights are plotted on the Y-axis 304 and the cost values are plotted on the X-axis 302. It is noted that the slope of the curve corresponding to the plot 300 should be high in the vicinity of the cost values to be able to distinguish between good matches and bad matches (i.e. to assign higher weights to selected pixel blocks with higher degree of match to the current pixel block and relatively lower weights to pixel blocks with lower degree of match to the current pixel block).

A high slope of the curve corresponding to the plot 300 may be achieved by choosing appropriately choosing a value of the noise variance ($\sigma^2$). In an embodiment, the noise variance is estimated based on an average difference measure for pixels corresponding to a previously filtered picture. In FIG. 3, the value of $\sigma$ is chosen to be 512 (and by extension a value of the first pre-defined threshold for assigning cost value to the current block may be n×512, for example 3×512). In an embodiment, since the value of $\sigma^2$ is estimated based on the average difference measure (mean cost value) of the previously filtered picture, the selected matching pixel blocks with cost values less than the mean cost value are assigned higher weights and vice versa.

It is noted that the value of $\sigma$ is important for separation of good matches and bad matches. As explained above, the noise variance estimate ($\sigma^2$) is selected as based on average difference measure for pixels corresponding to a previously filtered picture. However, it is observed that certain types of noise, such as intensity dependent noise, are more prominent in high intensity areas as compared to the low intensity areas. In an embodiment, the value of $\sigma^2$ is chosen based on intensity as will be explained herein with reference to FIG. 4. An example variation in values of assigned weights corresponding to different values of the noise estimate is depicted in FIG. 4.

Figure 4:
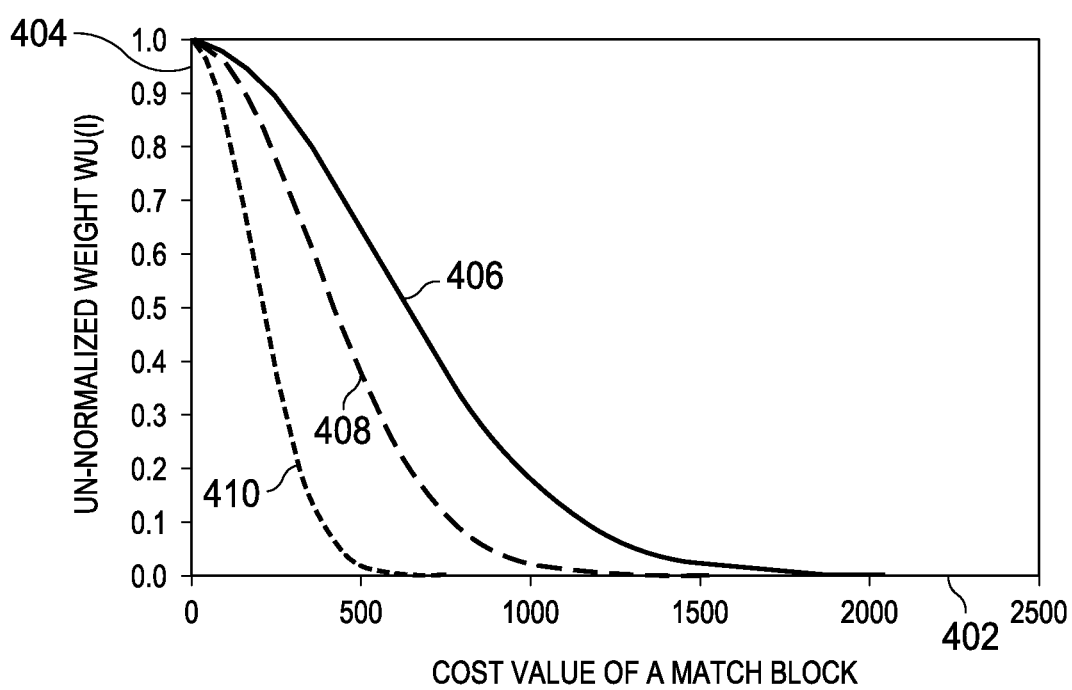
FIG. 4 depicts plots of variation in un-normalized weights with variation in cost values for different values of noise estimate in accordance with an example embodiment.

Referring now to FIG. 4, plots of variation in un-normalized assigned weights with variation in cost values for different values of noise variance estimate are depicted in accordance with an example embodiment. In FIG. 4, un-normalized weights assigned to the one or more pixel blocks are plotted on the Y-axis 404, and the corresponding cost values are plotted on the X-axis 402. The plots 406, 408 and 410 depict variation in un-normalized assigned weights with variation in cost values for estimated values of $\sigma$ corresponding to 768, 512 and 256 respectively. As can be seen from the plots 406, 408 and 410, intensity dependent noise is estimated by adjusting the value of the $\sigma$.

More specifically, the noise variance is estimated as follows. The processing module 202 computes an average intensity for pixels associated with the current pixel block. The processing module 202 identifies a range of intensities from among a plurality of ranges of intensities to which the computed average intensity belongs to, where the plurality of ranges of intensities correspond to the previously filtered picture. The processing module 202 estimates the noise variance to be equivalent to a value of noise variance associated with the identified range of intensities. The noise variance estimated in such a manner is utilized in equation (13) to compute the weights thereby accounting for intensity variation in weights computation.

In an embodiment, weights for filtering Y, $C_b$ and Cr components are computed using COST'$_Y$, COST'$C_b$ and COST'$C_r$ (explained with reference to equations 4, 5 and 6) of the matching pixel blocks, respectively.

In an embodiment, non-exponential weighting functions are also used. For example, in an embodiment, the weighting function for assigning weights based on cost value is defined as depicted in equations (14) and (15):

$$wu(i)=1/c(i) \tag{14}$$

$$wu(i)=\text{base}(-c(i)^2/\sigma^2) \tag{15}$$

Where
w(i) is un-normalized weight assigned to the $i^{th}$ pixel block
c(i) is un-normalized weight assigned to the $i^{th}$ pixel block
where base refers to mathematical base for an exponential function, for example mathematical constant "e" (or the value of base may be configured to be equivalent to 2 or 4 units).

In an embodiment, the processing module 202 is further configured to normalize weights assigned to each of the selected one or more pixel blocks and the current pixel block based on the equation (16):

$$\Sigma w(i)=1 \tag{16}$$

wherein,
i=0, 1, . . . Mtot
K=$\Sigma$wu(i); i=0, 1, . . . Mtot and
w(i)=wu(i)/K For example, the weights assigned to the selected one or more pixel blocks are normalized, such that the weights add up to 1. In an embodiment, the processing module 202 is further configured to generate a set of filtered pixels for the pixel block based on the assigned weights. In an embodiment, generating the set of filtered pixels includes performing a weighted pixel block averaging of the normalized weights and a set of corresponding pixels associated with each of the one or more pixel blocks and the pixel block. For example, if normalized weights for five pixel blocks (i.e. four matching pixel blocks and the current pixel block) are 0.25, 0.15, 0.3, 0.2 and 0.1 (such that they add up to one) and a first pixel of the five pixel blocks have example values of 10, 20, 15, 10 and 25 then the filtered version of the pixel has a value equivalent to 14.5 (0.25*10+0.15*20+0.3*15+0.2*10+0.1*25). The value may be rounded off to 14 or 15 based on pre-defined logic. For each pixel of the current pixel block, such a weighted pixel block averaging is performed with the selected one or more matching pixel blocks to generate the set of filtered pixels. It is noted that simplified example values of weights and pixel values are considered above for illustrating the weighted averaging for the pixel block of pixels corresponding to the current pixel block. It is noted that the example values may not be considered limiting and any such values may be utilized for performing weighted pixel block averaging of the normalized weights and the set of pixels corresponding to the selected one or more pixel blocks and the current pixel block.

It is noted that the cost assigned to the current pixel block is extremely critical as it controls the amount of filtering. For example, in a region of a picture where a new object that is not there in any of the reference picture appears and/or a scene change is experienced, the weight assigned to the current original pixel block must be much higher compared to the weights assigned to the references so that filtering or averaging do not happen for that pixel block. The exponential weighting function ensures assigning correct weight based on the associated cost value.

In an embodiment, the processing module 202 is further configured to control an amount of filtering based on a pre-defined tolerance value. In an embodiment, the pre-defined tolerance value specifies an amount of tolerable difference in the filtered block from the current pixel block (or between the filtered picture and the current picture).

In an embodiment, the processing module 202 is configured to perform dithering to the set of filtered pixels. For example, a slight amount of random noise may also be added to conceal some of the detail loss in the case of very high noise levels.

In an embodiment, the system 200 additionally includes components, such as an input unit (e.g., an image processing device), a video display unit (e.g., liquid crystals display (LCD), a cathode ray tube (CRT), and the like), a cursor control device (e.g., a mouse), a drive unit (e.g., a disk drive), a signal generation unit (e.g., a speaker) and/or a network interface unit. The input unit is configured to transfer the pictures corresponding to the video data to the memory module 204 in order to facilitate a filtering of noise from the pictures corresponding to the video data. The drive unit includes a machine-readable medium upon which is stored one or more sets of instructions (e.g., software) embodying one or more of the methodologies and/or functions described herein. In an embodiment, the software resides, either completely or partially, within the memory module 204, and/or within the processing module 202 during the execution thereof by the system 200, such that the processing module 202 and memory module 204 also constitute a machine-readable media. The software may further be transmitted and/or received over a network via the network interface unit.

The term "machine-readable medium" may be construed, for example, to include a single medium and/or multiple media (e.g., a centralized and/or distributed database, and/or associated caches and servers) that store the one or more sets of instructions. Moreover, the term "machine-readable medium" may be construed, for example, to include any medium that is capable of storing, encoding and/or carrying a set of instructions for execution by the system 200 and that cause the system 200 to perform any one or more of the methodologies of the various embodiments. Furthermore, the term "machine-readable medium" may be construed to include, but shall not be limited to, solid-state memories, optical and magnetic media, and carrier wave signals. The foregoing notwithstanding, it is noted that the present technology is not limited to any particular definition of "machine-readable medium".

Figure 5:
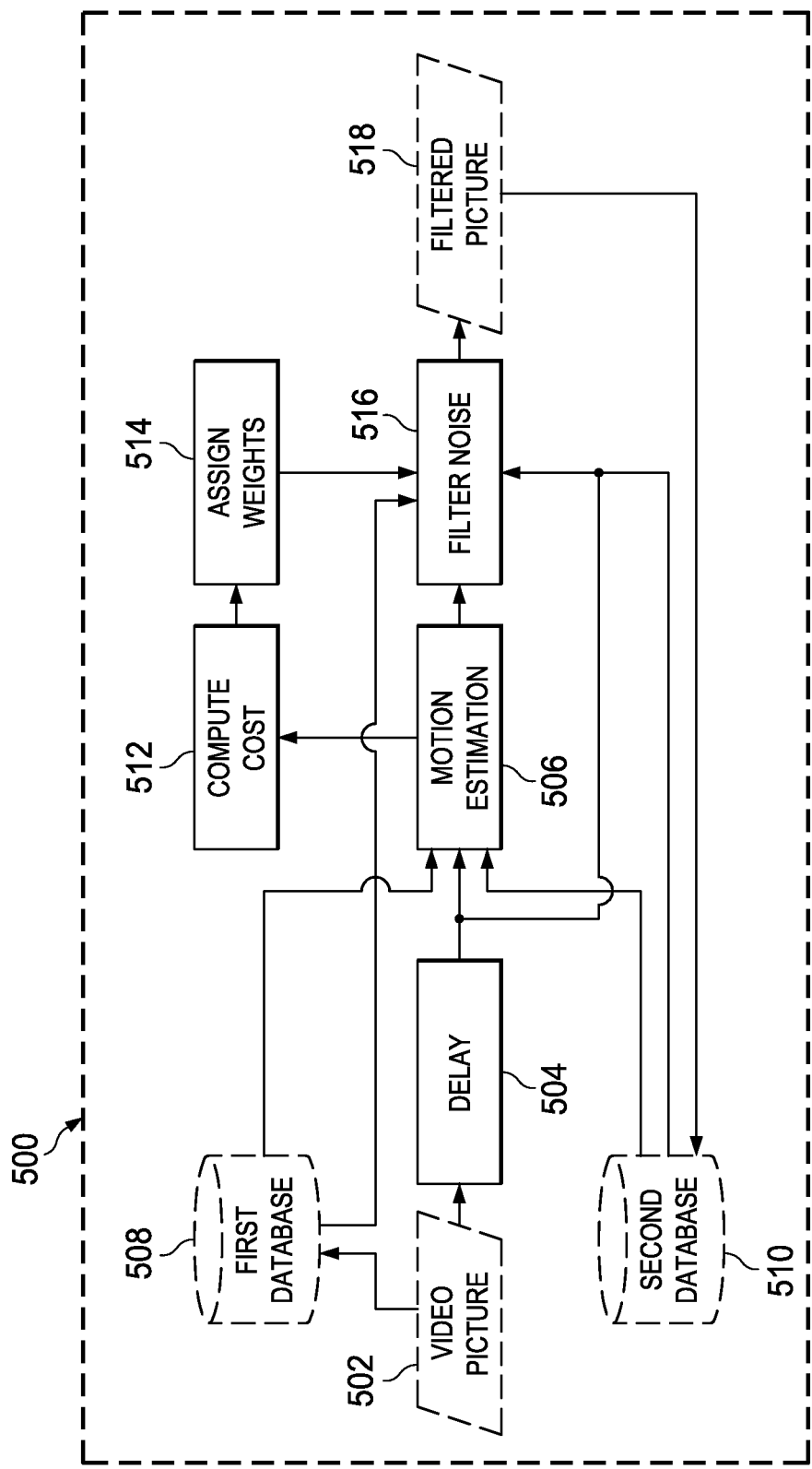
FIG. 5 illustrates a detailed overview of a process flow for filtering noise from a picture in a picture sequence associated with video data in accordance with an example embodiment.

FIG. 5 illustrates a detailed overview of a process flow 500 for filtering noise from a picture, such as a video picture 502, in a picture sequence associated with video data in accordance with an example embodiment. The process flow 500 may be executed by a system, such as the system 200. The process flow 500 is described herein with help of the system 200. However, the process flow 500 can be described and/or practiced by using a system other than the system 200.

The picture sequence including the video picture 502 (hereinafter referred to as 'picture 502') may be retrieved from memory module 204 of the system 200. Alternatively, the picture sequence may be received from a media capture device, such as a camera or any such imaging system. As explained with reference to FIG. 2, filtering noise from the video data involves filtering noise from one or more pixel blocks in each picture in the picture sequence corresponding to the video data. Accordingly, the picture 502 is subjected to various operations associated with the process flow 500 for filtering the noise from the picture 502. It is understood that remaining pictures in the picture sequence are similarly subjected to the operations associated with the process flow 500 for filtering of noise from the video data. The process flow 500 starts at operation 504. At 504, a delay is introduced in the process flow 500 to account for subsequent arrival of future reference pictures for filtering purpose.

At operation 506 of the process flow, the picture 502 is subjected to motion estimation (for example, by using the processing module 202). As explained with reference to FIG. 2, the memory module 204 is configured to store both, filtered and unfiltered forms of the past and future reference pictures. In FIG. 5, the unfiltered forms of reference pictures are depicted to be stored in a first database 508 and the corresponding filtered forms of the reference pictures are depicted to be stored in second database 510. In an embodiment, the first database 508 and the second database 510 correspond to storage locations within the memory module 204. In another embodiment, the first database 508 and the second database 510 are external to the system 200 and are configured to be in communication with memory module 204 for providing access to the filtered and unfiltered forms of reference pictures. In an embodiment, the filtered and the unfiltered forms of the reference pictures are stored in the same database. At operation 506, pixel blocks matching a current pixel block in the picture 502 are identified in the unfiltered and filtered forms of reference pictures, for example, by using pixel block matching motion estimation algorithms as explained with reference to FIG. 2. A cost value (for example, difference measure and/or penalty factor) may be computed (for example, by the processing module 202) for the identified pixel blocks and one or more pixel blocks from among the identified pixel blocks are selected based on least cost value. More specifically, a difference measure, such as SAD value, is computed for pixel luminance components only and one or more pixel blocks are selected based on the least SAD value.

Upon selection of the one or more pixel blocks, a cost value is recomputed at operation 512, where the difference measure of the pixel chrominance components are added to the difference measure of the pixel luminance components computed earlier to configure the total cost value for each of the selected one or more pixel blocks. At operation 514, weights are assigned to the selected one or more pixel blocks based on associated cost values. The assigning of weights may be performed based on equation (13) as explained with reference to FIG. 2. Alternatively, the weights may be assigned to the one or more pixel blocks based on intensity as explained with reference to FIG. 4. In some embodiments, non-exponential weighting functions may also be utilized for assigning weights to the one or more pixel blocks as explained with reference to equations (14) and (15).

At operation 516, the assigned weights are normalized and weighted pixel block averaging of normalized weights and set of pixels from each of the selected one or more pixel blocks (from the one or more reference pictures) and the current pixel block is performed to generate the filtered set of pixels or the filtered picture '518'. The weighted pixel block averaging takes into account motion vector information computed during the operation 506. The filtered picture is stored in the second database 510 as a filtered form of reference picture for filtering noise from subsequent pictures in the picture sequence. Similarly, a copy of the picture 502 is stored in the first database 508 prior to filtering of noise to be available as an unfiltered form of reference picture for filtering noise from subsequent pictures. A method for filtering noise from video data is explained with reference to FIG. 6.

Figure 6:
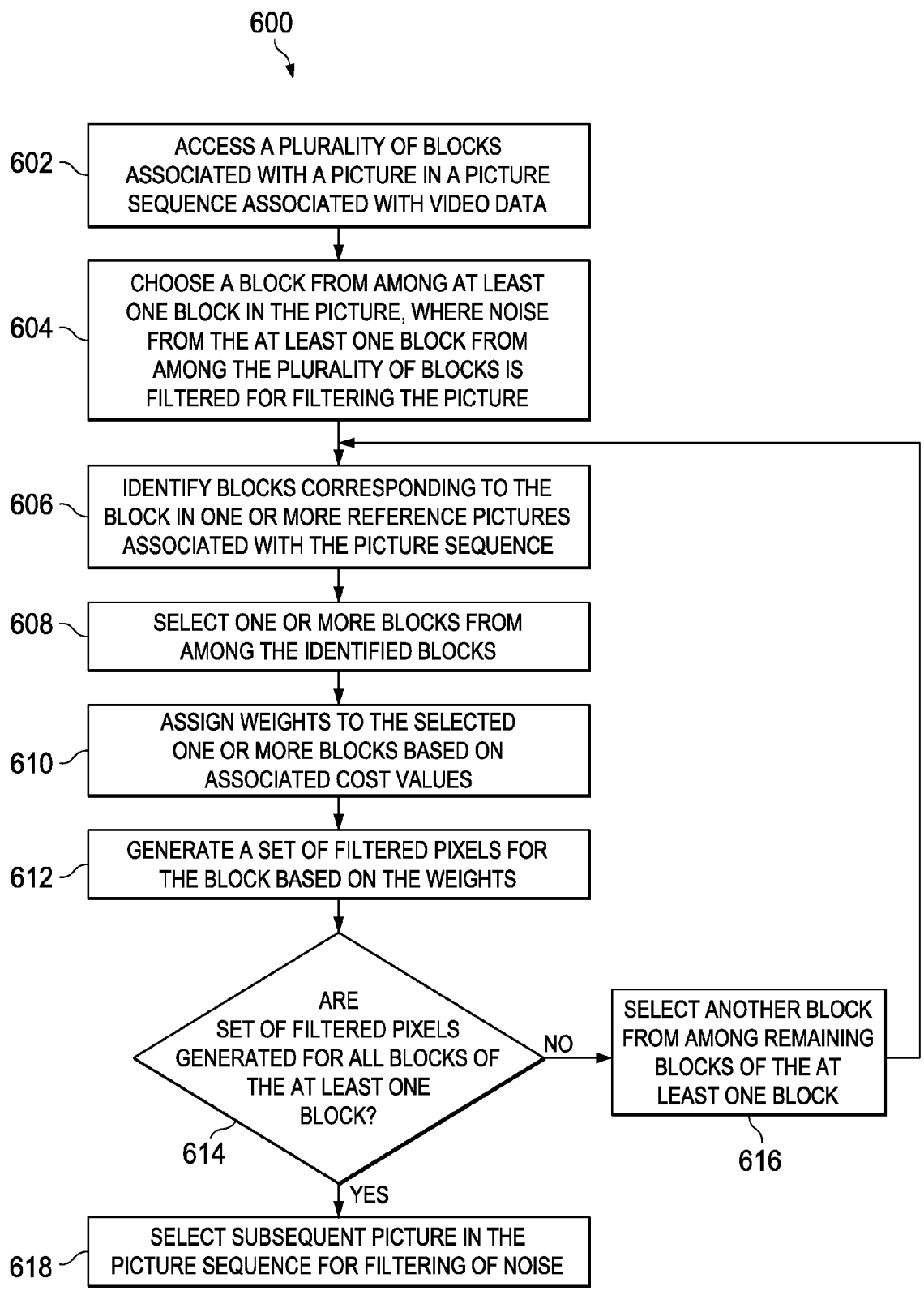
FIG. 6 is a flow diagram of a method for filtering noise from a picture in a picture sequence associated with video data in accordance with an example embodiment.

FIG. 6 is a flow diagram of a method 600 of filtering noise from a picture in a picture sequence associated with video data in accordance with an example embodiment. The method 600 depicted in the flow diagram may be executed by, for example, the system 200 explained with reference to FIG. 2. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the system 200. However, the operations of the method can be described and/or practiced by using a system other than the system 200. The method 600 starts at operation 602.

At operation 602, a plurality of pixel blocks associated with a picture in a picture sequence associated with video data are accessed (for example, from the memory module 204 of system 200). At operation 604, a pixel block (hereinafter referred to as a current pixel block) from among at least one pixel block in the picture is chosen, where noise from the at least one pixel block from among the plurality of pixel blocks is filtered for filtering the picture.

At operation 606, pixel blocks corresponding to the current pixel block in one or more reference pictures associated with the picture sequence are identified (for example, by the processing module 202 of FIG. 2). More specifically, pixel blocks in one or more reference pictures that are substantially matching the current pixel block are identified at operation 606. In an embodiment, the pixel blocks matching the pixel block in the one or more reference pictures are identified by executing BMME algorithm selected from among, but not limited to, a full search, a three-step search, a hexagonal search, a spiral search and a diamond search. More specifically, within a defined search window, any of the BMME algorithms is utilized for pixel block matching purposes. In an embodiment, multiple matching pixel blocks are identified per reference picture. For example, if motion estimation is performed on each of $N_{ref}$ number of reference pictures and if $M_{ref}$ is a number of best matching pixel blocks identified per reference $N_{ref}$ picture, then a total of $N_{ref}*M_{ref}$ matches are obtained.

In an embodiment, the one or more reference pictures includes a filtered form and an unfiltered form of at least one of pictures preceding the picture in the display order associated with the picture sequence and pictures succeeding the picture in the display order. The pictures preceding the current picture (i.e. the picture containing the current pixel block) in the display order associated with the picture sequence are hereinafter referred to as past reference pictures. The past reference pictures are used for filtering pixel blocks in the current picture for example, for satisfying low delay requirements. The pictures succeeding the current picture in the display order associated with the picture sequence are hereinafter referred to as future reference pictures.

In an embodiment, each identified pixel block is associated with a cost value. As explained with reference to FIG. 2, the cost value is a measure indicative of a correlation between an identified pixel block and the pixel block. In an embodiment, the cost value associated with each identified pixel block includes a difference measure computed between pixels corresponding to the each identified pixel block and the current pixel block. In an embodiment, the difference measure is one of a sum of absolute differences (SAD) measure and sum of squared error (SSE) measure. The computation of cost values for the one or more pixel blocks may be performed as explained in equations (1) to (6) with reference to FIG. 2.

At operation 608, one or more pixel blocks from among the identified pixel blocks are selected (for example, by the processing module 202 of FIG. 2) based on associated cost value. For example, from among $N_{ref}*M_{ref}$ matches, the processing module 202 may be configured to select $M_{tot}$ number of matches based on the cost values. The $M_{tot}$ number of matching pixel blocks and the current pixel block together configure the '$M_{tot}+1$' number of pixel blocks available for further processing.

In an embodiment, the method further includes associating (for example, by the processing module 202) a cost value with the current pixel block. In an embodiment, the cost value associated with the current pixel block is determined to be one of a minimum cost value from among cost values associated with the selected one or more pixel blocks and a first predetermined threshold (as explained with reference to equation (8)). In an embodiment, the cost value associated with the current pixel block is determined based on performing a spatial domain cost value estimation by searching around a pre-defined location in the picture. In an embodiment, the spatial domain cost value estimation is performed based on one of an estimation of a gradient associated with the current pixel block and a motion estimation search performed in the immediate neighborhood on the current pixel block as explained with reference to FIG. 2.

At operation 610, weights are assigned (for example, by the processing module 202 of FIG. 2) to the one or more pixel blocks based on corresponding cost values. In an embodiment, the processing module 202 is further configured to assign a weight to the current pixel block based on the associated cost value. In an embodiment, the weights are assigned to each of the one or more pixel blocks and the pixel block based on associated cost values and an estimate of noise variance. In an embodiment, the weights are assigned based on an exponential weighting function as depicted in equation (13). In an embodiment, the estimate of noise variance selected for assigning weights is chosen based on intensity as explained with reference to FIG. 4. In an embodiment, non-exponential weighting functions may also be used as explained with reference to equations (14) and (15).

At operation 612, a set of filtered pixels for the pixel block is generated (for example, by the processing module 202 of FIG. 2) based on the weights assigned to each of the selected one or more pixel blocks. In an embodiment, the assigned/associated weights assigned to each of the selected one or more pixel blocks and the current pixel block are normalized (for example, by the processing module 202) based on the equation (16).

At operation 614, it is determined (for example, by the processing module 202 of FIG. 2) whether a set of filtered pixels are generated for all pixel blocks of the at least one pixel block. If it is determined that the set of filtered pixels is not generated for all the pixel blocks, then operation 616 is performed. At operation 616, another pixel block is selected (for example, by the processing module 202 of FIG. 2) from among remaining pixel blocks of the at least one pixel block and the operations 606 to 616 are repeated till all of the pixel blocks from among remaining pixel blocks of the at least one pixel block are filtered. If it is determined that the set of filtered pixels is generated for all the pixel blocks from among remaining pixel blocks of the at least one pixel block, then operation 618 is performed. At operation 618, a subsequent picture in the picture sequence is selected (for example, by the processing module 202 of FIG. 2) for filtering of noise. An integrated circuit for filtering noise in pictures is explained with reference to FIG. 7.

Figure 7:
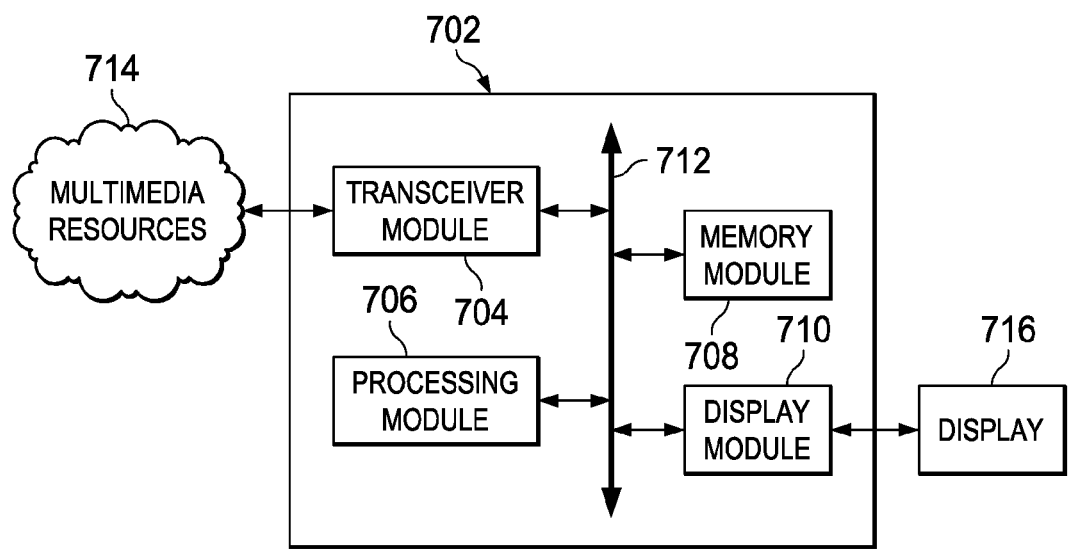
FIG. 7 is a block diagram of an integrated circuit configured to filter noise from a picture in a picture sequence associated with video data in accordance with an example embodiment.

FIG. 7 is a block diagram of an integrated circuit 702 configured to filter noise from a picture in a picture sequence associated with video data, in accordance with an embodiment. In an embodiment, the system 200 of FIG. 2 is embodied at least partially in the form of the integrated circuit 702. The integrated circuit 702 includes a transceiver module 604, a processing module 706, a memory module 708 and a display module 710. The transceiver module 704, the processing module 706, the memory module 708 and the display module 710 are communicatively associated or coupled with each other using data path 712. As such, it is noted that at least some of the components described below in connection with the integrated circuit 702 may be optional, and, thus, in an example embodiment the integrated circuit 702 includes more, less or different components than those described in connection with the example embodiment of FIG. 7. In an embodiment, the integrated circuit 702 may include only the processing module 706 and the memory module 708.

The transceiver module 704 is communicatively associated or coupled with a plurality of multimedia resources 714 and is configured to receive pictures associated with video data from one or more multimedia resources from among the plurality of multimedia resources 714. Examples of the multimedia resources include, but are not limited to (1) remote multimedia systems (2) media capture devices, such as, for example, a camera, camcorders and the like, and (3) multimedia storage devices, such as, for example, magnetic tapes, disks, computer-readable media, and the like. In an embodiment, the transceiver module 704 may include an antenna and/or network connectors configured to couple with or connect to wired networks (for example, local area networks (LANs)) and wireless networks (for example, cellular networks), or a combination thereof (for example, the Internet). Examples of network connectors may include a universal serial bus (USB) interface, a wireless LAN interface, an infrared interface, an Ethernet port, and the like.

The memory module 708 is configured to provide access to a plurality of pixel blocks associated with the picture. In an embodiment, the memory module 708 is substantially similar to the memory module 204 of system 200 of FIG. 2. The memory 708 is configured to perform functions as discussed in FIG. 2, which are not repeated herein for the sake of brevity. Examples of memory 708 include, but are not limited to, RAM, dual port RAM, SDRAM, DDR SDRAM, and the like.

The processing module 706 is configured to perform filtering noise from at least one pixel block from among the plurality of pixel blocks for filtering the picture. In an embodiment, the processing module 706 is configured to filter the pictures associated with the video data and provide the video data to the transceiver module 704 for transmission purposes or to memory module 708 for storage purposes. In an embodiment, the processing module 706 is substantially similar to the processing module 202 of system 200 of FIG. 2. The processing module 706 is configured to perform functions as discussed in FIG. 2, which are not repeated herein for the sake of brevity.

The display module 710 is configured to facilitate a display of the video data on display 716. The display 716 is facilitated, for example, in response to a user input received using a user interface (not shown in FIG. 6). Examples of display 716 include a liquid crystal display (LCD) panel, a plasma display panel, a field emission display and the like.

In an embodiment the integrated circuit 702 is an application processor chip. In an embodiment, the integrated circuit 702 is a part of a particular or shared processor chip that is embedded within a multimedia system. Examples of the multimedia system include, but are not limited to, (1) multimedia devices, such as, for example, cellular phones, digital video cameras and digital camcorders; (2) data processing devices, such as, for example, personal computers, laptops and personal digital assistants; and (3) consumer electronics, such as, for example, set top boxes, digital video disk (DVD) players and video network servers.

Without in any way limiting the scope, interpretation, or application of the claims appearing below, advantages of one or more of the example embodiments disclosed herein include filtering noise from a picture in a picture sequence associated with video data. The filtering of noise may be performed in low delay mode using only past reference pictures. The use of past reference pictures can sometimes result in excessive blurring of the image. However, on account of using both filtered and un-filtered reference pictures, the sharpness of the image can be retained while removing noise. Moreover, the disclosed techniques are effective in handling new objects and scene changes due to accurate cost assignment to the current pixel block and combined luminance chrominance cost usage. The combination of luminance and chrominance component cost values improves visual quality without corresponding increase in the complexity.

Furthermore, an extent of filtering of noise can be controlled by a number of matches selected from each reference picture. In some embodiments, even a single reference picture can yield a large number of matches for the current pixel block thereby facilitating a high amount of noise reduction even when using a single reference picture. It is noted that using a higher number of reference pictures and higher number of matches provides a much higher noise reduction without loss of details. Also, systems disclosed for noise filtering can be combined with a spatial noise filter to increase the noise filtering capability. Additionally, local noise estimation helps to adapt the filtering of noise to individual regions, without which some regions may not be filtered and other regions may be over filtered in sequences where noise/image characteristics vary within a picture. Also, the post processing stages explained above help to control and conceal the amount of blurring.

Although the present technology has been described with reference to specific example embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 200, the processing module 202 and the memory module 204 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the example embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these example embodiments, it is noted that certain modifications, variations, and alternative constructions may be apparent and well within the spirit and scope of the technology. Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A method for filtering noise from a picture in a picture sequence associated with video data, the method comprising:
    accessing a plurality of pixel blocks associated with the picture; and
    filtering noise from at least one pixel block from among the plurality of pixel blocks, wherein filtering noise from a pixel block from among the at least one pixel block comprises:
        identifying pixel blocks corresponding to the pixel block in one or more reference pictures associated with the picture sequence, wherein each identified pixel block is associated with a cost value, the cost value being a measure indicative of a correlation between an identified pixel block and the pixel block;
        selecting one or more pixel blocks from among the identified pixel blocks based on associated cost values;
        assigning weights to the selected one or more pixel blocks, wherein a weight is assigned to each of the selected one or more pixel blocks based on associated cost value; and
        generating a set of filtered pixels for the pixel block based on the weights.

2. The method of claim 1, wherein the pixel blocks corresponding to the pixel block are identified in the one or more reference pictures based on performing block matching motion estimation (BMME) based search, and, wherein a size of a block for performing the BMME based search is determined to be one of an overlapping size and a non-overlapping size corresponding to a size of the pixel block.

3. The method of claim 1, wherein the cost value associated with the each identified pixel block comprises a difference measure computed between pixels corresponding to the each identified pixel block and the pixel block, and, wherein the difference measure is one of a sum of absolute differences (SAD) measure and a sum of squared error (SSE) measure.

4. The method of claim 3, wherein the difference measure is computed based on pixel luminance components.

5. The method of claim 4, further comprising computing a difference measure corresponding to the pixel block for each of the selected one or more pixel blocks based on pixel chrominance components.

6. The method of claim 5, further comprising re-computing the cost value for each of the selected one or more pixel blocks, wherein the cost value is re-computed based on at least one of an un-weighted sum and a weighted sum of the difference measures computed for the pixel chrominance components and the pixel luminance components for corresponding pixels for each of the selected one or more pixel blocks, and, a penalty factor determined based on estimated motion vectors for each of the selected one or more pixel blocks.

7. The method of claim 1, wherein the one or more reference pictures comprises a filtered form and an unfiltered form of at least one of pictures preceding the picture in a display order associated with the picture sequence and pictures succeeding the picture in the display order.

8. The method of claim 1, further comprising associating a cost value with the pixel block and assigning a weight to the pixel block based on the associated cost value.

9. The method of claim 8, wherein the cost value associated with the pixel block is determined to be one of a minimum cost value from among cost values associated with the selected one or more pixel blocks and a first pre-determined threshold.

10. The method of claim 8, wherein the cost value associated with the pixel block is determined based on performing a spatial domain cost value estimation by searching around a pre-defined location in the picture.

11. The method of claim 8, wherein the weights are assigned to the selected one or more pixel blocks and the pixel block based on associated cost values and an estimate of noise variance.

12. The method of claim 11, wherein the noise variance is estimated based on an average difference measure for pixels corresponding to a previously filtered picture.

13. The method of claim 11, wherein the noise variance is estimated by:
    computing an average intensity for pixels associated with the pixel block;
    identifying a range of intensities from among a plurality of ranges of intensities to which the computed average intensity belongs to, wherein the plurality of ranges of intensities corresponds to a previously filtered picture; and
    estimating the noise variance to be equivalent to a value of noise variance associated with the identified range of intensities.

14. The method of claim 11, further comprising normalizing weights assigned to the selected one or more pixel blocks and the pixel block.

15. The method of claim 14, wherein the generating the set of filtered pixels comprises performing a weighted pixel block averaging of the normalized weights and a set of corresponding pixels associated with each of the selected one or more pixel blocks and the pixel block.

16. The method of claim 15, further comprising performing at least one of controlling an amount of filtering for the set of filtered pixels based on a pre-defined tolerance value, and, a dithering to the set of filtered pixels.

17. A system for filtering noise from a picture in a picture sequence associated with video data, the system comprising:
 a memory module configured to provide access to a plurality of pixel blocks associated with the picture; and
 a processing module communicatively associated with the memory module for filtering noise from at least one pixel block from among the plurality of pixel blocks, wherein for filtering noise from a pixel block of the at least one pixel block, the processing module is configured to:
  identify pixel blocks corresponding to the pixel block in one or more reference pictures associated with the picture sequence, wherein each identified pixel block is associated with a cost value, the cost value being a measure indicative of a correlation between an identified pixel block and the pixel block;
  select one or more pixel blocks from among the identified pixel blocks based on associated cost values;
  assign weights to the selected one or more pixel blocks, wherein a weight is assigned to each of the selected one or more pixel blocks based on associated cost value; and
  generate a set of filtered pixels for the pixel block based on the weights.

18. The system of claim 17, wherein the processing module is further configured to:
 associate a cost value with the pixel block and assign a weight to the pixel block based on the associated cost value; and
 normalize weights assigned to the selected one or more pixel blocks and the pixel block.

19. The system of claim 18, wherein a weighted pixel block averaging of the normalized weights and a set of corresponding pixels associated with each of the selected one or more pixel blocks and the pixel block is performed to generate the set of filtered pixels.

20. A non-transitory computer-readable medium storing a set of instructions that when executed cause a computer to perform a method for filtering noise from a picture in a picture sequence associated with video data, the method comprising:
 accessing a plurality of pixel blocks associated with the picture; and
 filtering noise from at least one pixel block from among the plurality of pixel blocks, wherein filtering noise from a pixel block from among the at least one pixel block comprises:
  identifying pixel blocks corresponding to the pixel block in one or more reference pictures associated with the picture sequence, wherein each identified pixel block is associated with a cost value, the cost value being a measure indicative of a correlation between an identified pixel block and the pixel block;
  selecting one or more pixel blocks from among the identified pixel blocks based on associated cost values;
  assigning weights to the selected one or more pixel blocks, wherein a weight is assigned to each of the selected one or more pixel blocks based on associated cost value; and
  generating a set of filtered pixels for the pixel block based on the weights.

* * * * *